US008634763B2

(12) United States Patent
Oyman et al.

(10) Patent No.: US 8,634,763 B2
(45) Date of Patent: Jan. 21, 2014

(54) COOPERATIVE COMMUNICATIONS TECHNIQUES

(75) Inventors: Ozgur Oyman, Palo Alto, CA (US); Jaroslaw J. Sydir, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1305 days.

(21) Appl. No.: 12/107,598

(22) Filed: Apr. 22, 2008

(65) Prior Publication Data

US 2009/0262678 A1   Oct. 22, 2009

(51) Int. Cl.
*H04B 3/36* (2006.01)

(52) U.S. Cl.
USPC ............ 455/7; 455/11.1; 455/15; 455/445; 455/16; 455/422.1; 370/310; 370/315; 370/322; 370/328; 370/329

(58) Field of Classification Search
USPC ............ 455/7, 11.1, 15, 16, 24, 422.1, 403, 455/500, 517, 445, 550.1; 370/310, 315, 370/322, 328, 329
See application file for complete search history.

(56) References Cited

U.S. PATENT DOCUMENTS

| | | | |
|---|---|---|---|
| 2004/0205105 | A1 | 10/2004 | Larsson et al. |
| 2005/0272366 | A1 | 12/2005 | Eichinger et al. |
| 2006/0233200 | A1 | 10/2006 | Fifield et al. |
| 2007/0002766 | A1 | 1/2007 | Park et al. |
| 2007/0160014 | A1* | 7/2007 | Larsson ............ 370/338 |
| 2007/0217432 | A1 | 9/2007 | Molisch et al. |
| 2008/0049718 | A1 | 2/2008 | Chindapol et al. |
| 2008/0155148 | A1 | 6/2008 | Oyman |
| 2008/0175183 | A1* | 7/2008 | Devroye et al. ........... 370/315 |
| 2008/0222478 | A1 | 9/2008 | Tamaki |
| 2008/0248793 | A1* | 10/2008 | Chang et al. ............ 455/422.1 |
| 2008/0285500 | A1* | 11/2008 | Zhang et al. ............ 370/315 |
| 2008/0285502 | A1* | 11/2008 | Deng et al. ............. 370/315 |
| 2009/0097433 | A1* | 4/2009 | Shen et al. ............. 370/315 |
| 2010/0002619 | A1* | 1/2010 | Hart et al. ............. 370/315 |
| 2010/0304667 | A1* | 12/2010 | Chen et al. ............. 455/9 |

FOREIGN PATENT DOCUMENTS

| | | |
|---|---|---|
| EP | 2068487 | 6/2009 |
| JP | 2002141856 | 5/2002 |
| JP | 2007266876 | 10/2007 |
| WO | 2005008947 | 1/2005 |
| WO | 2009131867 A2 | 10/2009 |
| WO | 2009131867 A3 | 10/2009 |

OTHER PUBLICATIONS

Sendonaris, A., et al., "Increasing Uplink Capacity via User Cooperation Diversity," Proc. IEEE International Symposium on Information Theory, Cambridge, MA, Aug. 1998, p. 156.
Suga, J., et. al, "Downlink HARQ for transparent RS", IEEE C802.16j-07/232r3, May 2007.
Suga, J., et. al, "Uplink HARQ for transparent RS", IEEE C802.16j-07/233r3, May 2007.

(Continued)

*Primary Examiner* — Keith Ferguson
(74) *Attorney, Agent, or Firm* — Kacvinsky Daisak PLLC

(57) ABSTRACT

Techniques are disclosed involving communications between source and destination devices. Such communications may involve multiple cooperating devices that retransmit (e.g., simultaneously retransmit) transmissions sent by a source device. Thus, the delivery of transmissions from source devices to destination devices may involve two or more "hops" (e.g., a first "hop" comprising an initial transmission, and a second "hop" comprising two or more relay transmissions).

20 Claims, 11 Drawing Sheets

(56) References Cited

OTHER PUBLICATIONS

Office Action received for Japanese Patent Application No. 2010-549947, mailed Nov. 6, 2012, 2 pages including 1 page English translation.

Office Action received for UK Patent Application No. GB1017378.9, received Dec. 20, 2012, 5 pages.

Cao et al., "Cooperative Coding using Serial Concatenated Convolutional Codes", Dept. of Electrical and Computer Engineering, The George Washington University, IEEE Communication Society / WNCN (2005), pp. 1001-1006 (No Month).

Stanojev et al., "Performance of Multi-Relay Collaborative Hybrid-ARQ Protocols over Fading Channels", IEEE Communications Letters, vol. 10, No. 7, Jul. 2006, pp. 22-524.

Office Action received for Japanese Patent Application No. 2010-549947, mailed on Jun. 12, 2012, 6 pgs. including 3 pgs. English translation.

Office Action received for Korean Patent Application No. 10-2010-7023530, mailed on Aug. 22, 2011, 6 pgs. including 3 pgs. English translation.

Wenshu Zhang et al., "Performance Investigation of Distributed STBC-OFDM System With Multiple Carrier Frequency Offsets," The 17th Annual IEEE International Symposium on Personal, Indoor and Mobile Radio Communications (PIMRC'06)(Sep. 11, 2006).

Krishna S. Gomadam et al., "Optimal Distributed Beamforming in Relay Networks with Common Interference," Proceedings of IEEE GLOBECOM 2007(Nov. 26, 2007).

Office Action received for Chinese Patent Application No. 200980110658.5, mailed Dec. 5, 2012, 21 pages including 13 pages English translation.

Kim et al., "Cooperative System with Distributed Beamforming and Its Outage Probability", Proceedings of VTC Spring. 2007, IEEE, 1638-1641.

Jing et al., "Distributed Space-Time Coding in Wireless Relay Networks", IEEE Transactions on Wireless Communications, vol. 5, No. 12, Dec. 2006, pp. 3524-3536.

Office Action received for UK Patent Application No. GB1017378.9, mailed Jul. 17, 2012, 3 pgs.

\* cited by examiner

COOPERATIVE COMMUNICATIONS TECHNIQUES

BACKGROUND

Wireless data communications networks are often subject to slow fading. Slow fading occurs when the signal propagation environment changes slowly relative to the data communications rate. This may occur when the coherence time of a communications channel is larger than several frame durations.

Slow fading may cause communications problems, such as bursts of errors. Such bursts may significantly degrade data communications performance and negatively impact the reliable decoding of the transmitted data. One approach to mitigating slow fading in wireless networks involves using cooperative diversity techniques, where terminals sharing their antennas and other resources. Such techniques create a virtual array (i.e., a virtual multiple-input multiple-output (MIMO) system) through distributed transmission and signal processing. As a result, spatial diversity and distributed array gains may be realized.

If the communication system can tolerate a certain amount of delay, the erroneous data can be retransmitted using an automatic repeat request (ARQ) protocol. According to such protocols, frames are examined at a receiving device for errors (e.g., through a cyclic redundancy check (CRC)). If no errors are detected in a received frame, the receiving end sends an acknowledgement (ACK) of successful transmission to the sending device. However, if errors are detected, a negative acknowledgement (NACK) requesting retransmission is sent to the sending device. The NACK may not be sent in some cases, for example, if the frame was lost in its way and the receiver did not receive it at all. Also, a sending device may construe a NACK by not receiving an ACK within a time limit. In response to a NACK, the sending device retransmits the frame. This may occur until an ACK is received or until a retransmission number limit is reached.

In addition to ARQ protocols, hybrid ARQ (HARQ) algorithms may be employed. The HARQ protocols operate in a fundamentally similar way with ARQ protocols, but may also combine error detection and correction in order to obtain better reliability and throughput, e.g., data and CRC bits may be additionally protected by an error correcting code which increases the probability of successful transmission. Moreover, HARQ protocols may combine previously observed erroneous packets with the retransmitted packets using techniques such as chase combining, incremental redundancy or code combining.

In certain situations, existing ARQ and HARQ protocols are not sufficient to enhance communication link reliability. For example, when a deep fade occurs, existing ARQ and HARQ protocols may not improve the quality of a communications link, since, poor channel conditions are likely to be experienced by both initially-sent transmissions subsequent retransmissions. Thus, a substantial increase in the average number of retransmissions, as well as a substantial decrease in throughput, may occur.

DETAILED DESCRIPTION

Various embodiments may involve communications between source and destination devices. Such communications may involve multiple cooperating devices that retransmit (e.g., simultaneously retransmit) or relay transmissions sent by a source device. Thus, the delivery of transmissions from source devices to destination devices may involve two or more "hops" (e.g., a first "hop" comprising an initial transmission, and a second "hop" comprising two or more relay retransmissions).

Thus, embodiments may exploit the multiplicity of wireless links and may realize spatial diversity and array gains through cooperation among source devices and cooperating devices (some of which may have better quality connections to the destination device). As a result, destination devices may receive multiple independently-faded versions (retransmissions) of initial transmissions from source. This may increase the likelihood of reliable decoding by destination devices. As a result, the expected number of retransmissions required for successful decoding may be advantageously decreased.

Also, in embodiments, a direct link between source and destination devices may not exist at all, or may not be used (e.g., by choice) to send data. In such situations, communications between source and destination devices may involve multiple cooperating devices that receive source device transmissions and relay (e.g., simultaneously retransmit) the source device transmissions.

Moreover, HARQ operations may take place on a link-by-link or hop-by-hop basis, for example, when the direct link between the source device and destination device does not exist. Thus, for each hop, transmissions and retransmissions may continue until successful receiving device reception.

I. Operational Environments

FIGS. 1A-1D illustrate an example environment in which communications may occur between multiple devices. In particular, this environment includes a source device 102, a destination device 104, and multiple cooperating devices 106, 108, 110, and 112. Transmissions may be exchanged among these devices in accordance with any communications protocol. Additionally, any transmission technique and/or encoding scheme (e.g., error detection/correction coding or network coding) may be employed for such transmissions.

Although FIGS. 1A-1D show four cooperating devices (106, 108, 110, and 112), environments may include any number of cooperating devices. Further, in embodiments, any number of source devices and/or destination devices may be associated with any number of cooperating devices.

Figure 1B:
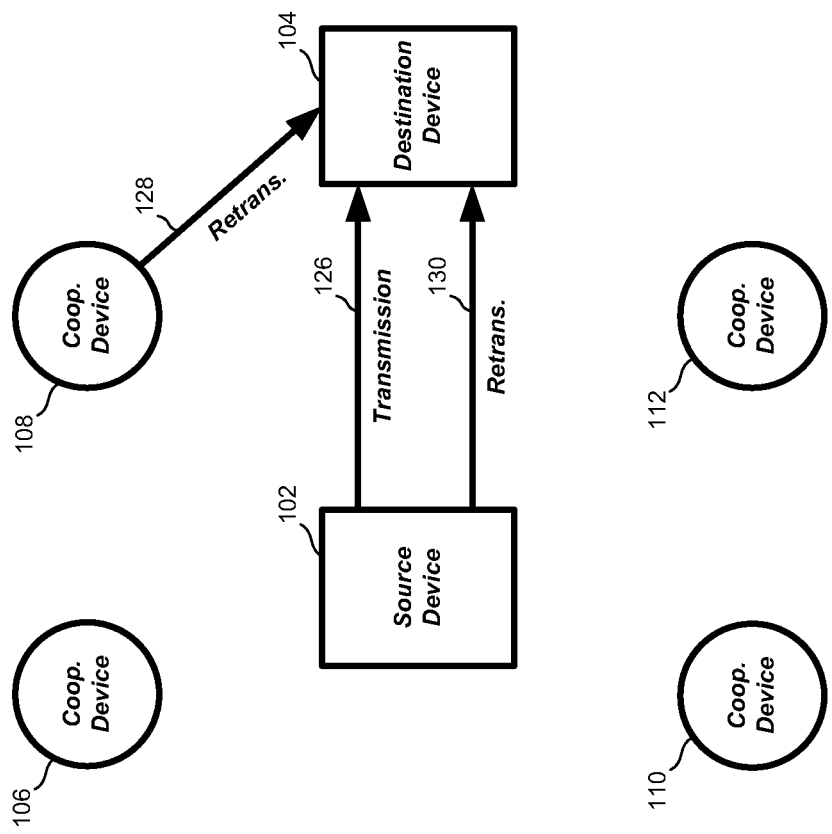
FIGS. 1A-1D are diagrams of a communications environment.
Figure 1A:
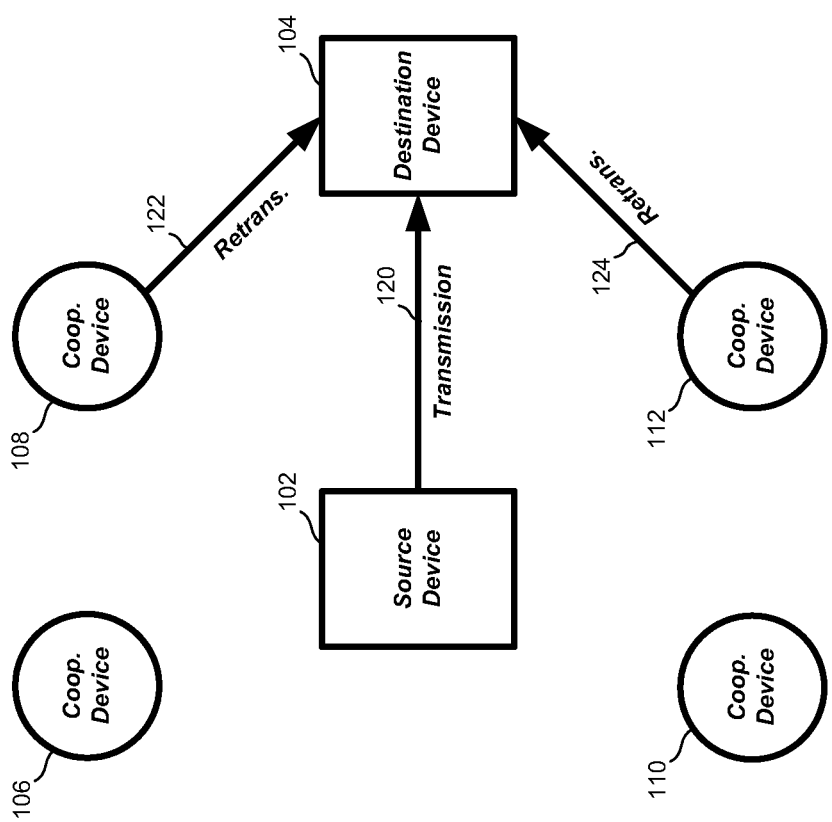

In embodiments, cooperating devices may assist in communications between source device 102 and destination device 104. For example, FIGS. 1A and 1B provide communications examples in accordance with a relay-assisted approach. As shown in FIG. 1A, source device 102 sends a transmission 120 to destination device 104. Although not shown, cooperating devices 108 and 112 also receive transmission 120.

In this example, destination device 104 is unable to decode transmission 120. Hence, FIG. 1A also shows cooperating devices 108 and 112 sending retransmissions 122 and 124 (i.e., retransmissions of transmission 120) to destination device 104. In embodiments, however, any number of cooperating devices may be engaged in the cooperative retransmission of transmission 120 upon the failure of destination device 104 to decode initial transmission 120.

In embodiments, source device 102 may also operate as a cooperating device. Accordingly, FIG. 1B shows source device 102 sending a transmission 126 to destination device 104. In addition, FIG. 1B shows source device 102 sending a retransmission 130 to destination device 104 and cooperating device 108 sending a retransmission 128 to destination device 104. These retransmissions are of transmission 126. Moreover, these retransmissions may occur simultaneously through cooperative techniques.

In FIGS. 1A and 1B, such retransmissions may occur as a result of destination device 104 not receiving (or not successfully decoding) the first transmission from source device 102 (e.g., transmission 120 or transmission 126). This may be determined, for example, through NACK messaging.

Figure 1D:
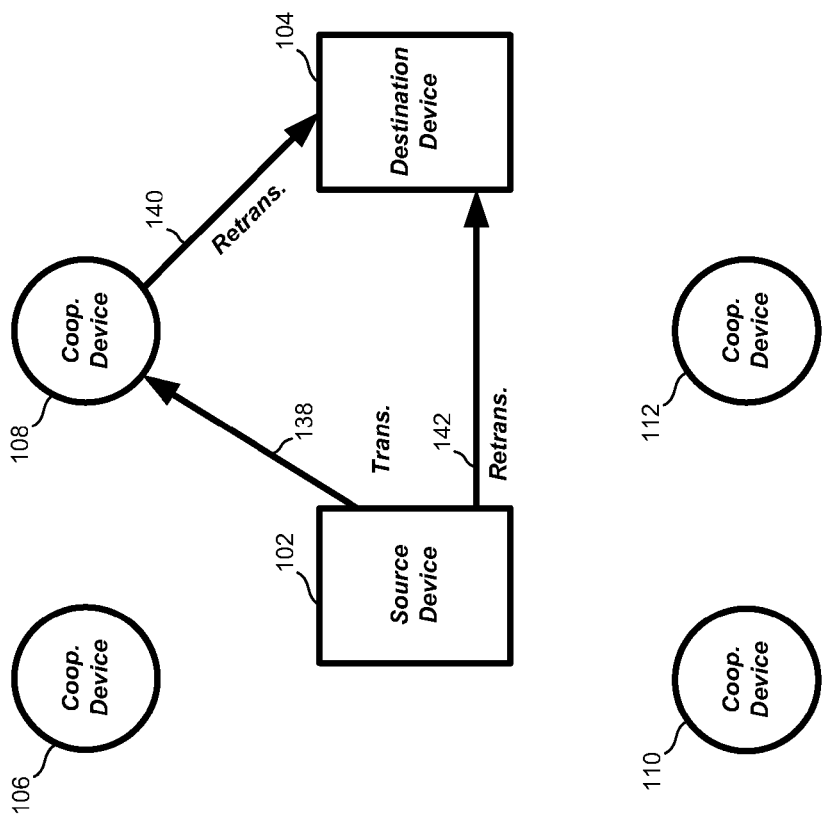
Figure 1C:
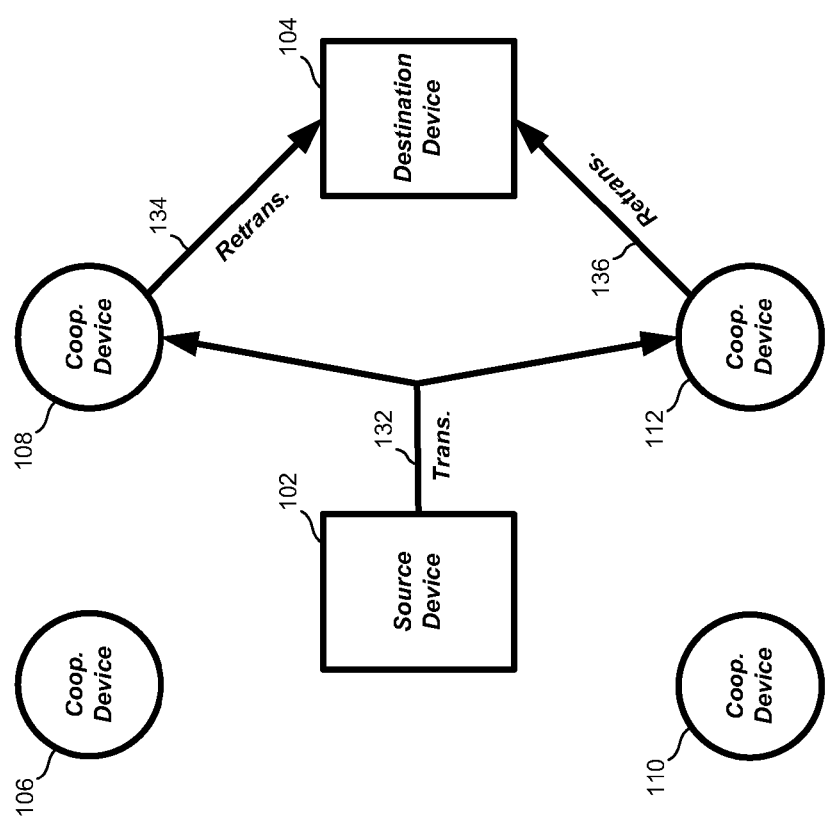

FIGS. 1C and 1D provide communications examples in accordance with a hop-by-hop approach. According to this approach, a direct link between source device 102 and destination device 104 is not used. This may occur because a link between these devices does not exist or has poor quality. Accordingly, this approach may be employed when data transmissions cannot reach (or are not likely to reach) destination device 104. However, this approach is not limited to such situations.

As shown in FIG. 1C, source device 102 sends a transmission 132. This transmission is received by cooperating devices 108 and 112. Cooperating devices 108 and 112 reliably decode transmission 132. In turn, these cooperating devices send retransmissions 134 and 136 (i.e., relayed versions of transmission 132) to destination device 104. These retransmissions contain the same information content as transmission 132. If necessary, cooperating devices 108 and 112 may cooperatively resend retransmissions 134 and 136 until successful reception by destination device 104 occurs.

As described above, source device 102 may also act as a cooperating device. Accordingly, FIG. 1D shows source device 102 sending a transmission 138, which is reliably decoded by cooperating device 108. In turn, source device 102 sends a retransmission 142 to destination device 104, and cooperating device 108 sends a retransmission 140 to destination device 104. These retransmissions (which are relayed transmissions of transmission 138) contain the same information content as transmission 138. If necessary, source device 102 and cooperating device 108 may cooperatively resend retransmissions 140 and 142 until successful reception by destination device 104 occurs.

The occurrence and characteristics of the retransmissions in FIGS. 1A-1D may be determined by source device 102 and/or destination device 104. This may involve selecting a set of cooperating devices to send such retransmissions, as well as selecting transmission techniques (e.g., distributed space-time coding, distributed beamforming, and so forth) for the retransmissions. Moreover, source device 102 and/or destination device 104 may communicate with such cooperating devices to facilitate the retransmissions.

The employment of two or more cooperating devices (such as in FIGS. 1A-1D) may advantageously provide higher diversity. As a result, reliability may be improved by sending appropriately coded signals across different paths during the sending and resending of a transmission. In addition, by employing more than one cooperating device, an enhanced probability of a "first hop" transmission being successfully decoded by at least one cooperating device is achieved. Thus, the need for a source device to send the first hop transmission again (as a result of unsuccessful decoding) may be reduced.

Embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented, unless otherwise indicated. In addition, the given logic flow may be implemented by a hardware element, a software element executed by a processor, or any combination thereof. Embodiments are not limited to this context.

II. Exemplary Logic Flows

Figure 2A:
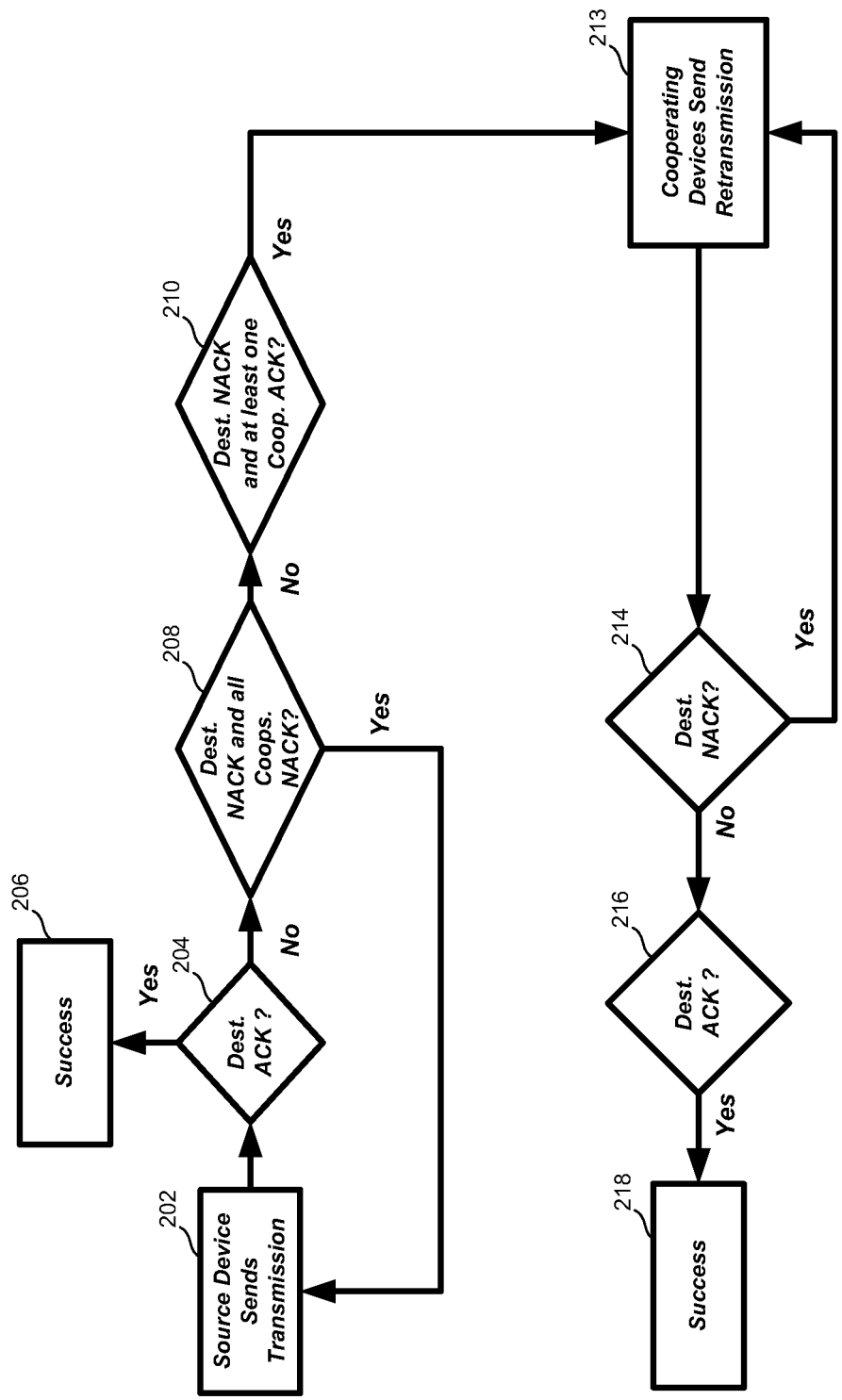
FIGS. 2A, 2B, and 3 illustrate exemplary logic flows.
Figure 2B:
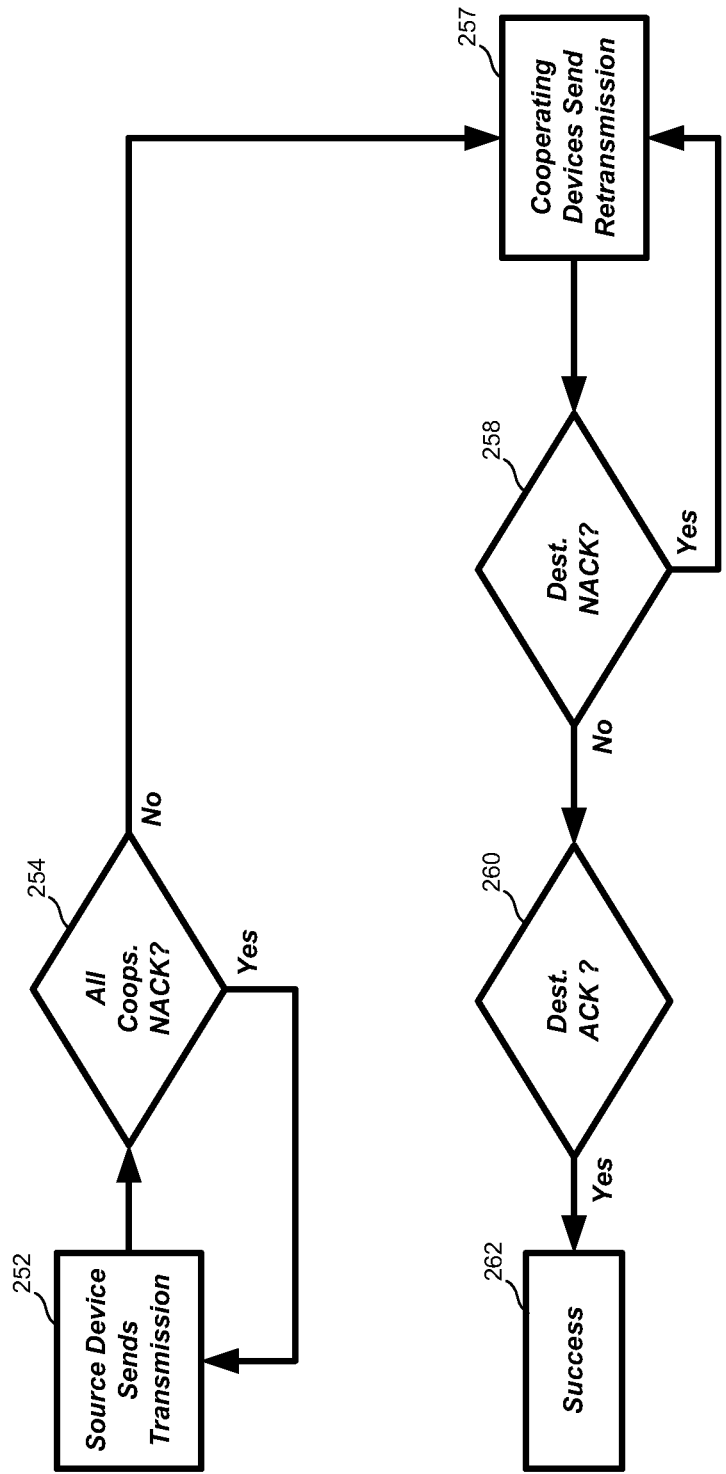

FIGS. 2A and 2B are diagrams of exemplary logic flows involving the employment of cooperating devices in the delivery of communications from a source device to a destination device. In particular, the flow of FIG. 2A provides an example according to a relay-assisted approach (such as in the examples of FIGS. 1A-1B), while the flow of FIG. 2B provides an example according to a hop-by-hop approach (such as in the examples of FIGS. 1C-1D).

These flows are described with reference to a source device, a set of multiple cooperating devices, and a destination device. As described above, the set of cooperating devices may also include the source device. Although each of FIGS. 2A and 2B shows a particular sequence, other sequences may be employed. Also, the depicted operations may be performed in various parallel and/or sequential combinations.

The approaches of FIGS. 2A and 2B may be employed in different situations. For instance, the approach of FIG. 2A may be employed when a direct communications link exists between a source and a destination device. However, the approach of FIG. 2B may be employed when a direct communications link between a source device and a destination device does not exist (or is weak).

FIG. 2A shows a logic flow 200 in which relay-assisted techniques are employed. This approach is also referred to herein as an enhanced cooperative relay-assisted hybrid ARQ (HARQ) algorithm.

The flow of FIG. 2A includes a block 202, at which the source device sends a transmission to a destination device. At this point, the destination device may await ("listen") for this transmission. Additionally, one or more cooperating devices may await the same transmission. Further, the destination device and the one or more cooperating devices attempt to decode the transmission sent by the source device. Based on these attempts, the destination and cooperating devices may transmit (e.g., broadcast) acknowledgement (e.g., ACK/NACK) messages.

Accordingly, such acknowledgements (ACK(s) or NACK(s)) from the destination device and the one or more cooperating devices are sought. Moreover, the absence of a response after a predetermined time interval may be construed as a NACK.

At a block 204, it is determined whether the destination device has sent an ACK. If so, then operation proceeds to a block 206. Otherwise, operation proceeds to a block 208.

At block 206, it is concluded that the transmission was successfully received by the destination device. Thus, in embodiments, the source device may proceed with further transmissions (if any) to the destination device (in accordance with employed communications protocol(s), transmission schedules, etc.).

However, at block 208, it is determined whether the destination device and all of the cooperating devices have sent NACKs. If so, then operation returns to block 202, where the source device sends the transmission again.

However, if not, then at a block 210, it is determined whether the destination device has sent a NACK and at least one cooperating device has sent an ACK. If so, then operation proceeds to a block 213.

At block 213, a set of cooperating devices retransmits the transmission that was sent at block 202. The formation of this set comprises selecting among cooperating devices that have sent ACK message(s) (the source device may also be included in this set). When the set of cooperating devices comprises multiple devices, these retransmissions may employ distributed transmission techniques. Exemplary techniques include (but are not limited to) virtual multi-input multi-output (MIMO), distributed space-time coding, and/or distributed beamforming. Embodiments, however, are not limited to these examples. In embodiments, the destination device is informed about the specific retransmission technique(s) so that it can adapt its reception accordingly.

Following the retransmissions, a response transmission from the destination device is sought. As described above, such a response transmission may be an ACK or a NACK.

At a block 214, it is determined whether the destination device sent a NACK. If so, then operation returns to block 213, where the retransmission is sent again. Thus, the cooperating devices may continue retransmitting the transmission until the destination device decodes the packet correctly, or until an established maximum number of retransmissions occur. In embodiments, the set of cooperating devices may be changed for every retransmission.

As indicated by a block 216, if the destination device sends an ACK, then operation proceeds to a block 218. At this block, receipt of the retransmissions by the destination device is determined to be successful. Thus, the source device may proceed with further transmissions (if any) to the destination device (in accordance with employed communications protocol(s), transmission schedules, etc.).

FIG. 2B shows a logic flow 250 in which hop-by-hop techniques are employed. This approach is also referred to herein as an enhanced cooperative hop-by-hop hybrid ARQ (HARQ) algorithm.

The flow of FIG. 2B includes a block 252, at which the source device sends a transmission. At this point, one or more cooperating devices may await this transmission. Further, the one or more cooperating devices attempt to decode the transmission sent by the source device. Based on these attempts, the cooperating device(s) may transmit (e.g., broadcast) acknowledgement (e.g., ACK/NACK) messages.

Following this, response transmissions from the one or more cooperating devices are sought. As indicated above, such responses may be ACKs, and NACKs. Moreover, the absence of a response after a predetermined time interval may be construed as a NACK.

At a block 254, it is determined whether all of the cooperating devices have sent NACKs. If so, then operation returns to block 252, where the source device sends the transmission again. However, if not, then operation proceeds to a block 257.

At a block 257, a set of cooperating devices retransmit (e.g., simultaneously retransmit) the transmission sent at block 252. The formation of this set comprises selecting among cooperating devices that have sent ACK message(s) (the source device may also be included in this set). When the set of cooperating devices comprises multiple devices, these retransmissions may employ distributed transmission techniques. As described above, examples of such techniques include (but are not limited to) virtual MIMO, distributed space-time coding, and/or distributed beamforming. Embodiments, however, are not limited to these examples. In embodiments, the destination device is informed about the specific retransmission technique so that it can adapt its reception accordingly.

After this, a response transmission from the destination device is sought. As described above, such a response transmission may be an ACK or a NACK.

At a block 258, it is determined whether the destination device sent a NACK. If so, then operation returns to block 257, where the retransmission is sent again. Thus, the set of cooperating devices may continue retransmitting the transmission until the destination device decodes the packet correctly, or until an established maximum number of retransmissions occur. In embodiments, the set of cooperating devices may be changed for every retransmission.

However, a block 260 indicates that, if the destination device sends an ACK, then operation proceeds to a block 262. At this block, receipt of the retransmissions by the destination device is determined to be successful. Thus, source device 220 may proceed with further transmissions (if any) designated for destination device (in accordance with employed communications protocol(s), transmission schedules, etc.).

The aforementioned techniques may be employed in various types of communications networks. Exemplary networks include (but are not limited to) the Institute of Electrical and Electronic Engineers (IEEE) 802.16 networks (e.g., Worldwide Interoperability for Microwave Access (WiMAX) networks and WiMAX II networks).

In such networks, these techniques may be employed for both uplink and downlink transmissions. For downlink transmissions, source devices may include base stations, cooperating devices may include relay stations, and destination devices may include mobile stations. For uplink transmissions, source devices may include mobile stations, cooperating devices may include relay stations, and destination devices may include base stations. The embodiments, however, are not limited to these examples.

As described herein, various aspects of two hop communications may be directed by a device, such as a source device and/or a destination device. For instance, examples are provided below in which base stations may direct certain aspects of two hop communications. In such examples, base stations may operate as source devices for downlink communications, and as destination devices for uplink communications.

Figure 3:
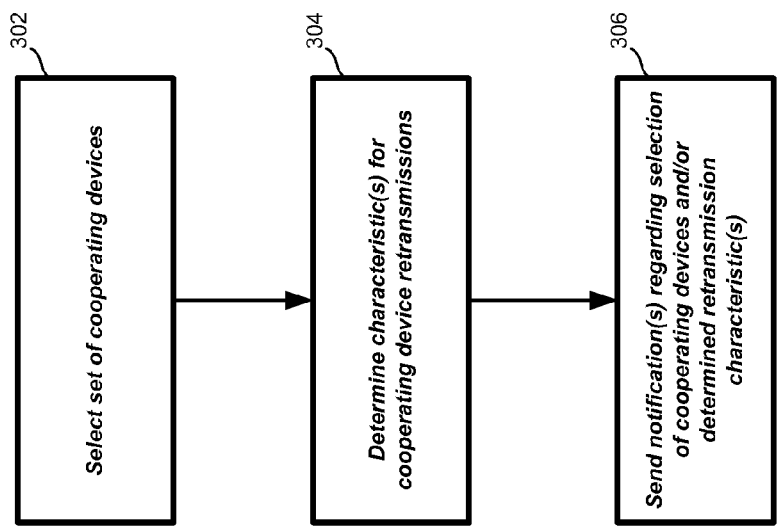

FIG. 3 shows a logic flow 300 in which a device directs aspects of two-hop communications. This device may be a source device or a destination device. For example, this device may be a base station. However, other devices may perform these operations. Although FIG. 3 shows a particular sequence, other sequences may be employed. Also, the depicted operations may be performed in various parallel and/or sequential combinations.

The flow of FIG. 3 includes a block 302, in which the device selects two or more cooperating devices (also referred to herein as a set of cooperating devices). As described herein, the set of cooperating devices may include one or more devices that acknowledged receipt of an initial transmission from the source device. Also, this set of cooperating devices may include the source device.

Alternatively or additionally, block 302 may involve selecting cooperating devices based on various selection criteria. Examples of such criteria may include (but are not limited to) network topology, terrain characteristics, channel characteristics, and/or destination mobility levels.

At a block 304, characteristic(s) are determined for retransmissions by the selected set of cooperating devices. These retransmissions are of an initial transmission (e.g., an initial data burst transmission) by a source device. The determined characteristic(s) may include resource allocations. Such allocations may include resource(s) for the retransmissions. In addition, such allocations may include resource(s) for ACK/NACK messaging by the set of cooperating devices.

Also, the determined characteristic(s) may include one or more transmission techniques. As described herein, such technique(s) may include virtual MIMO schemes, distributed space-time coding, and/or distributed beamforming. The embodiments, however, are not limited to these examples.

At a block 306, the device sends one or more notifications. These notification(s) may indicate the selection of block 302. Also, these notification(s) may indicate the characteristics determined at block 304.

These notification(s) may be sent in broadcast transmissions, such as in UL-MAPs and/or DL-MAPs (described in further detail below). Additionally or alternatively, these notification(s) may be sent in point-to-point messages, such as in non-broadcast MAC messages. Such point-to-point messages may be directed to devices in the set of cooperating devices.

III. Exemplary Device Implementations

Figure 4:
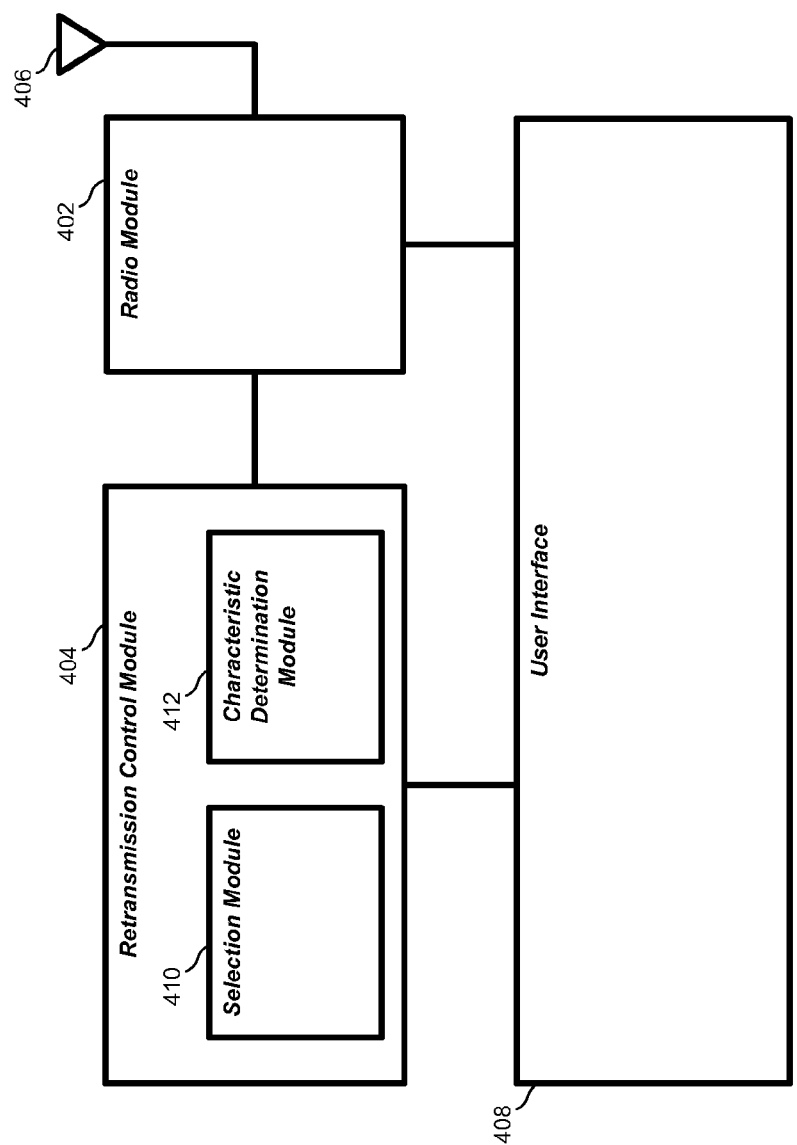
FIG. 4 illustrates an exemplary device implementation.

FIG. 4 illustrates an exemplary apparatus 400 that may communicate according to the techniques described herein. For instance, apparatus 400 may perform the operations of FIGS. 2A, 2B, and 3. Thus, apparatus 400 may operate as a source device, a destination device, a cooperating device, and/or a device that directs retransmission techniques.

FIG. 4 shows that apparatus 400 may comprise various elements, such as a radio module 402 and a retransmission control module 404. Also, FIG. 4 shows that apparatus 400 may include a user interface 408. These elements may be implemented in hardware, software, firmware, or any combination thereof.

Radio module 402 may provide for the exchange of wireless signals through one or more antennas (such as through an antenna 406). These wireless signals may be in accordance various types of wireless networks. Exemplary networks include IEEE 802.16 WiMax/WiMAX II networks. However, embodiments are not limited to such networks.

To provide such features, radio module 402 may include electronics, such as modulators, demodulators, amplifiers, filters, and/or antennas. Furthermore, communications interface module 106 may include components and/or functionality to operate according to one or more protocol layers. Such protocol layers may provide features, such as packet encapsulation/decapsulation, error correction encoding/decoding, signaling, link protocols, and/or media access protocols. Embodiments, however, may include other components and/or functionality. These features may be implemented in hardware, software, firmware, or any combination thereof.

Retransmission control module 404 performs operations involving the manner in which retransmissions are performed. For instance, FIG. 4 shows that retransmission control module 404 includes a selection module 410 that may select a set of cooperating devices. Such selections may be in accordance with the techniques described herein. Also, FIG. 4 shows that retransmission control module 404 includes a characteristic determination module 412 that may determine retransmission characteristics, as described herein.

User interface 408 facilitates user interaction. This interaction may involve the input of information from a user and/or the output of information to a user. Accordingly, user interface 408 may include one or more devices, such as a keyboard (e.g., a full QWERTY keyboard), a keypad, a display (e.g., a touch screen), a microphone, and/or an audio speaker. The embodiments, however, are not limited to these examples.

As described above, the elements of FIG. 4 may be implemented in hardware, software, firmware, or any combination thereof. Thus, implementations may include one or more processors that execute instructions or control logic (e.g., software) stored in a storage medium (e.g., memory). The embodiments, however, are not limited to such implementations.

IV. Exemplary Frame Format

Figure 5:
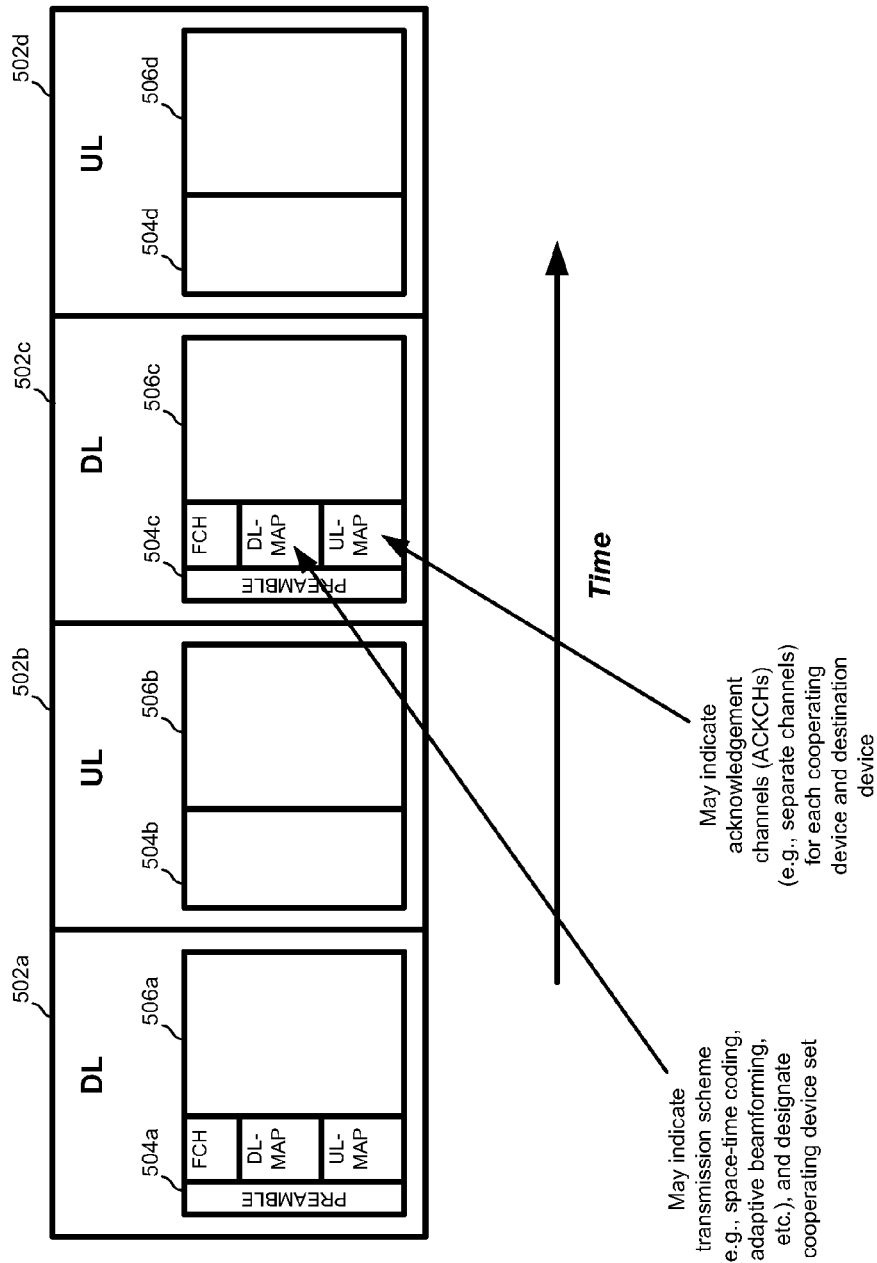
FIG. 5 is a diagram of a network frame format.

FIG. 5 is a diagram of a transmission frame format 500 that may be employed various types of networks (e.g., WiMAX networks, WiMAX II networks, and other networks). As shown in FIG. 5, this format comprises a sequence of subframes 502a-d that occur on a repeating basis. These subframes alternate between being reserved for downlink transmissions and uplink transmissions. For instance, subframe 502a is for downlink data transmissions, subframe 502b is for uplink data transmissions, subframe 502c is for downlink data transmissions, and subframe 502d is for uplink data transmissions. This pattern continues for subsequent subframes.

Further, FIG. 5 shows that each of subframes 502a-d includes a portion 504 allocated for control transmissions, and a portion 506 allocated for data transmissions. These transmissions may be in the form of bursts.

Within each portion 504, a base station may transmit resource allocation information. Such allocations may be for downlink communications and/or uplink communications. For example, in the context of WiMAX/WiMAX II networks, each portion 504 may include DL-MAP and UL-MAP resource allocations.

In embodiments, portions 504 may be transmitted using transmission techniques and/or encoding techniques that provide a greater probability of successful reception than for data transmissions sent in portions 506. Such greater probabilities may come at the expense of a lower effective bit rate.

As described above, allocation information may be transmitted in each portion 504. For example, FIG. 5 shows portions 504a and 504c (of downlink subframes 502a and 502c) each including a DL-MAP for downlink allocations and an UL-MAP for uplink allocations. The DL-MAP and UL-MAP may employ various information elements (IEs) to indicate characteristics for communications according to techniques described herein.

For example, FIG. 5 shows that the DL-MAP may indicate a transmission technique (e.g., MIMO, distributed space-time coding, distributed beamforming, etc.) for retransmissions. Also, the DL-MAP may designate a cooperating device set. The UL-MAP may indicate acknowledgement channels (ACKCHs) (e.g., separate channels) for each cooperating device and the destination device. Such UL-MAP and DL-MAP allocations may be employed for downlink communications (e.g., from a base station to a mobile station). Embodiments may employ similar allocations may be employed for uplink communications.

V. Exemplary Downlink Communications

Exemplary downlink communications are now described. In particular, such communications techniques are described in the context of a base station (BS), one or more cooperating devices (also referred to as relay station(s) (RSs)), and a mobile station (MS). Although these techniques are described in the context of WiMAX/WiMAX II communications, they may be applied in other contexts.

Before a downlink data transmission occurs, the BS allocates resources. For instance, the BS may transmit a DL-MAP to the MS and the one or more RSs to specify a downlink data burst transmission. In addition, the BS may transmit a UL-MAP to specify resource allocations for ACK/NACK messaging. In embodiments, such allocations may be made so that the BS receives ACK/NACK messages from each RS and MS separately.

Moreover, the BS may also receive channel quality information about each RS. The MS may use this information to identify link strength between the RS(s) and the MS. Based on these identified link strengths, the BS may employ this information in selecting a set of cooperating devices from the RS(s). This channel quality information may be sent to the BS in the second hop in the form of CQI or MAC messages.

Scheduling decisions may be made at the BS such that the BS may send data to both the BS and RS(s) in the presence of transparent or non-transparent relaying. For instance, in embodiments, the determination of the set of cooperating RS(s) and the specification of cooperative transmission technique(s) are decision that may typically be made at the BS. In further embodiments, however, some determinations (e.g., scheduling decisions) may be made at the RS(s). Thus, a set of transparent cooperating devices (e.g., designated by the BS) is able to send (in a second hop) a downlink data burst transmission that was sent by the BS (in a first hop).

Exemplary downlink communications according to the hop-by-hop approach and the relay-assisted approach are now described.

A. Hop-By-Hop

According to the enhanced cooperative hop-by-hop HARQ algorithm, one or more RS(s) may receive a downlink data burst transmitted by the BS (since the RS(s) know about this burst transmission from the DL-MAP). If none of the RSs successfully decode the burst (e.g., if all RSs send NACKs back to the BS), then the BS retransmits the downlink data burst. However, in accordance with the hop-by-hop techniques described herein, the RS(s) may relay this data burst transmission to the MS over a next hop.

More particularly, if one or more RSs can decode the downlink data burst correctly (and one or more ACKs sent by the RS(s) are received by the BS), the BS selects a set of cooperating terminals. The BS may select this set from those RS(s) that have sent ACK message(s). Also, as described above, this set of cooperating terminals may include the BS.

Based on this selection, the BS allocates resource(s) for the set of cooperating terminals. For instance, the BS may transmit a downlink allocation in a DL-MAP that provides time-frequency resources for the cooperating terminals to simultaneously transmit to the MS using particular transmission technique(s). Also, the BS may determine and transmit an uplink allocation in an UL-MAP that provides for ACK/NACK messaging of the MS.

In accordance with these allocations, the set of cooperating terminals send the data burst transmission to the MS. If the MS replies back with a NACK, then the BS notifies the set of cooperating terminals to retransmit the data burst transmission to the MS.

Figure 6:
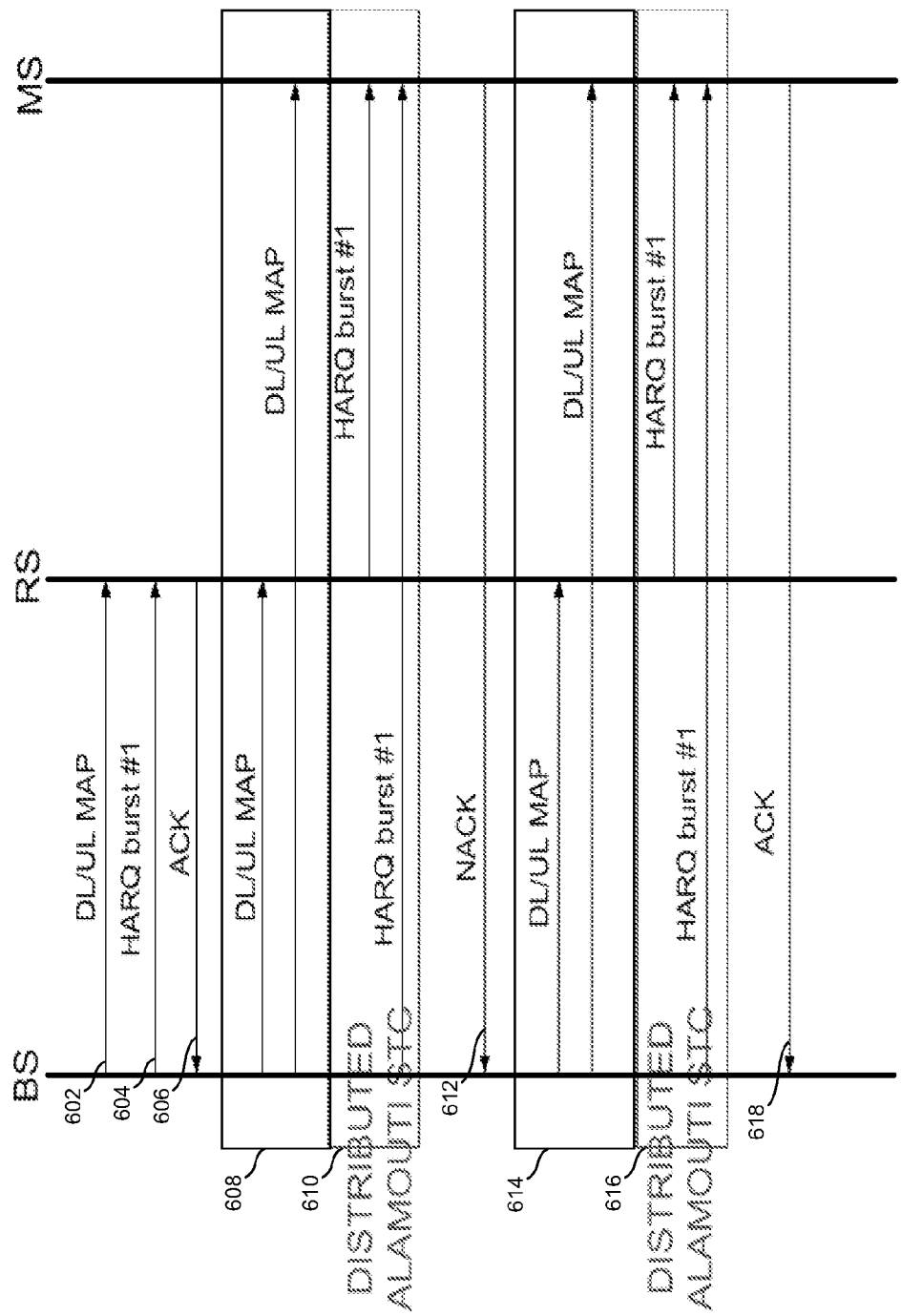
FIGS. 6-9 are diagrams of exemplary communications.

FIG. 6 is a diagram showing exemplary downlink communications according to the enhanced cooperative hop-by-hop HARQ algorithm. In particular, FIG. 6 shows an interaction among a base station (BS), a relay station (RS), and a mobile station (MS).

This interaction includes a step 602, in which the BS transmits resource allocations (e.g., in the form of a DL-MAP and an UL-MAP). These allocations provide resources for a downlink data transmission from the BS to the RS, as well as for ACK/NACK messaging from the RS.

Based on these resource allocations, the BS sends the downlink data transmission (shown as HARQ burst #1) in a step 604. Subsequently, at a step 606, the RS sends the BS an ACK message, indicating successful decoding of HARQ burst #1.

At a step 608, the BS sends resource allocations (e.g., in the form of a DL-MAP and an UL-MAP). These allocations provide for retransmission of the downlink data transmission, as well as for ACK/NACK messaging from the MS. Based on these allocations, the BS and the RS retransmit HARQ Burst #1 at a step 610. As shown in FIG. 6, this involves simultaneous transmission according to a distributed Alamouti space-time code. However, other techniques may be employed.

Following this, the MS sends a NACK to the BS at a step 612, indicating its unsuccessful decoding of HARQ burst #1. Thus, the BS transmits further resource allocations (e.g., in a DL-MAP and a UL-MAP) at a step 614. These allocations provide for the retransmission of HARQ burst #1 by the BS and the RS, as well as for ACK/NACK messaging by the MS.

According to these allocations, the BS and the RS retransmit HARQ Burst #1 once again at a step 616. As shown in FIG. 6, this involves simultaneous transmission according to a distributed Alamouti space-time code. However, other techniques may be employed.

At a step 618, the MS sends an ACK message to the BS. Based on this, the BS concludes that successful decoding of HARQ burst #1 has occurred.

B. Relay-Assisted

According to the enhanced cooperative relay-assisted HARQ algorithm, the BS transmits a data burst transmission directly to the MS over a first hop. One or more RS(s) monitor this data burst transmission from the BS to the MS (since the RS(s) know of this transmission from the DL-MAP). The RSs perform this monitoring in order to potentially relay this data burst transmission to the MS over a next hop (if necessary).

As described above, the BS may allocate resources (e.g., in the UL-MAP) for separate ACK/NACK messaging of MS and RS(s). The set of cooperators transmit data when: 1) they receive a NACK message from MS regarding transmission over the BS-MS link (i.e., when the MS fails to receive the data burst transmission), and 2) when one or more RSs can decode the data burst transmission correctly. When these two conditions occur, the BS selects a set of cooperating terminals from the RS(s) that ACK message(s). Also, the BS may be in the set of cooperating terminals.

Based on this selection, the BS allocates resource(s) for the set of cooperating terminals. For instance, the BS may transmit a DL-MAP that provides for the set of cooperating terminals to simultaneously retransmit the data burst transmission to the MS using particular transmission technique(s). Also, the BS may determine and transmit an uplink allocation in an UL-MAP that provides for ACK/NACK messaging of the MS.

In accordance with these allocations, the set of cooperating terminals send the data burst transmission to the MS. If the MS replies with a NACK, then the BS notifies the set of cooperating terminals to retransmit the data burst transmission to the MS. However, if neither the MS nor the RS(s) can successfully decode the data burst transmission over the first hop (i.e., if the MS and RS(s) send NACKs back to the BS), then the BS then retransmits the data burst transmission.

Figure 7:
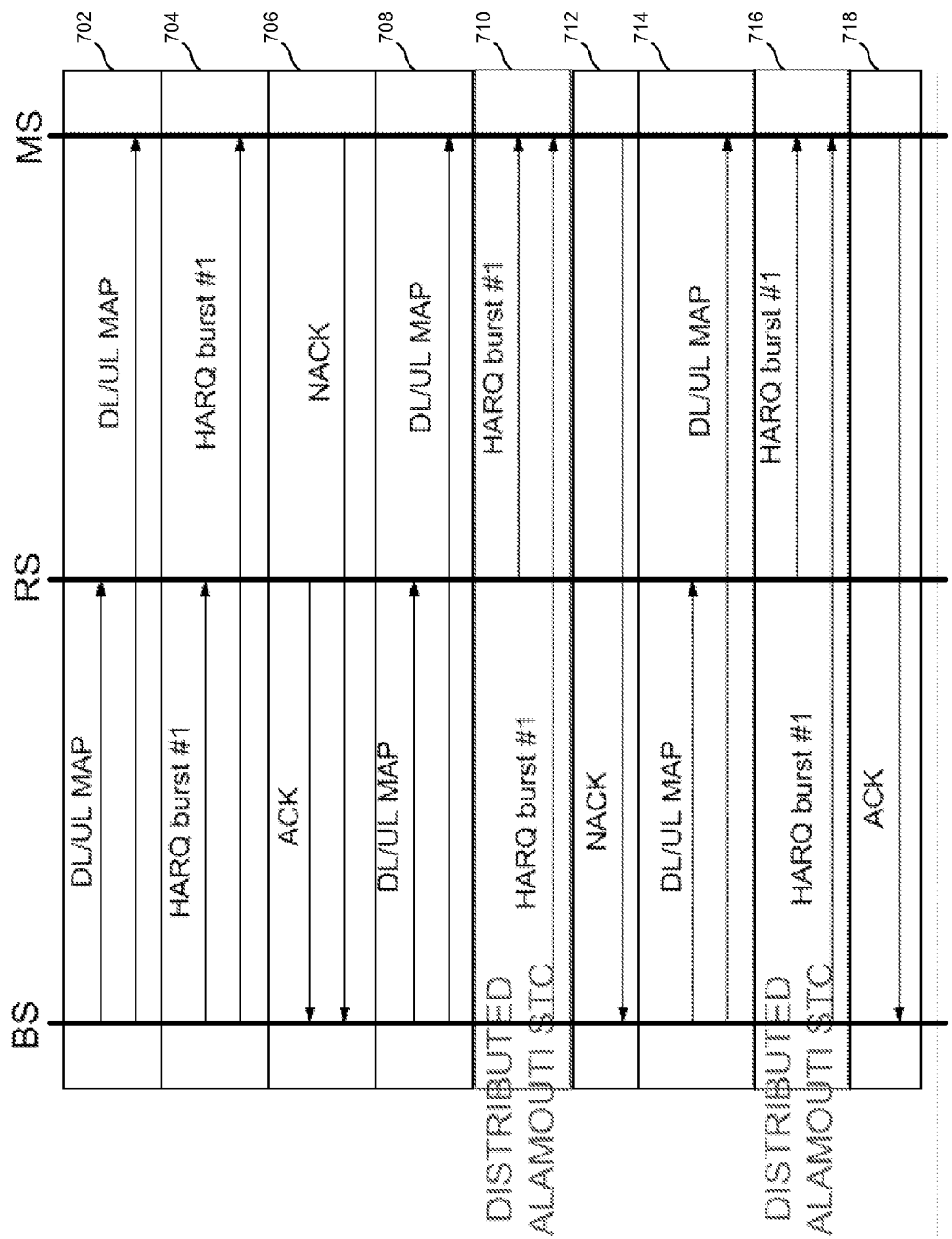

FIG. 7 is a diagram showing exemplary downlink communications according to the enhanced cooperative relay-assisted HARQ algorithm employed in downlink communications. In particular, FIG. 7 shows an interaction among a base station (BS), a relay station (RS), and a mobile station (MS).

This interaction includes a step 702, in which the BS transmits resource allocations (e.g., in the form of a DL-MAP and an UL-MAP). These allocations provide resources for a downlink data transmission from the BS to the MS, as well as for ACK/NACK messaging from the RS and the MS.

Based on these resource allocations, the BS sends the downlink data transmission (shown as HARQ burst #1) in a step 704. As shown in FIG. 7, this transmission is simultaneously sent to the RS and the MS. Subsequently, at a step 706, the RS sends the BS an ACK message (indicating successful decoding of HARQ burst #1), while the MS sends the BS a NACK message (indicating unsuccessful decoding of HARQ burst #1). Accordingly, retransmission techniques are employed.

In particular, at a step 708, the BS sends resource allocations (e.g., in the form of a DL-MAP and an UL-MAP). These allocations provide for retransmission of the downlink data transmission, as well as for ACK/NACK messaging from the MS. Based on these allocations, the BS and the RS retransmit HARQ Burst #1 at a step 710. As shown in FIG. 7, this involves simultaneous transmission according to a distributed Alamouti space-time code. However, other techniques may be employed.

Following this, the MS sends a NACK (indicating unsuccessful decoding of HARQ burst #1) to the BS at a step 712. Thus, the BS transmits further resource allocations (e.g., in a DL-MAP and a UL-MAP) at a step 714. These allocations provide for the retransmission of HARQ burst #1 by the BS and the RS, as well as for ACK/NACK messaging by the MS.

According to these allocations, the BS and the RS retransmit HARQ Burst #1 once again at a step 716. As shown in FIG. 7, this involves simultaneous transmission according to a distributed Alamouti space-time code. However, other techniques may be employed.

At a step 718, the MS sends an ACK message to the BS. Based on this, the BS concludes that HARQ burst #1 was successfully decoded.

VI. Exemplary Uplink Communications

Exemplary uplink communications are now described in the context of a BS, one or more RSs, and an MS. Although these techniques are described in the context of WiMAX/WiMAX II communications, they may be applied in other contexts.

For these uplink transmissions, the MS and one or more RS(s) may receive a resource allocation from the BS (e.g., in a UL-MAP) for an uplink data burst transmission from the MS. Furthermore, the RS(s) may receive a resource allocation from the BS (e.g., in a UL MAP) for ACK/NACK messaging (i.e. an ACK channel (ACKCH)).

Scheduling decisions may be made at the BS such that the MS may send data to both the BS and RS(s) in the presence of transparent or non-transparent relaying. A set of transparent cooperating devices (e.g., RS(s) designated by BS) may hear the uplink data burst transmission sent by the MS. Also, the BS receives ACK/NACK signals from each RS separately. Moreover, the BS also receives channel quality information about each RS toward the selection of cooperators in the retransmission phase in the form of CQI or MAC messages.

A. Hop-By-Hop

According to the enhanced cooperative hop-by-hop HARQ algorithm, the BS allocates ACK channels for the one or more RS(s) to inform the BS about the outcome of their decoding attempts on the uplink transmission by the MS in the first hop. If one or more RS(s) have successfully decoded the uplink burst transmission from the MS (learned by the BS through ACK/NACK messages from each RS), the BS confirms by sending an ACK message to the MS.

At this point, second hop transmissions may be handled by a set of cooperating terminals (composed of RS(s) and/or the MS) in order to relay this burst to the BS over a second hop.

To do this, the BS selects a set of cooperating terminals from the RS(s) that have sent ACK message(s). Also, the MS may be selected as a cooperating terminal. Upon this selection, the BS allocates bandwidth (which may be communicated in an UL MAP) to the set of cooperating terminals. This allocated bandwidth may provide for the uplink data burst transmission to be relayed (e.g., simultaneously relayed) using cooperative relaying techniques.

In embodiments, the BS does not send ACK/NACK messages to the set of cooperating devices. However, if the BS cannot recover a data burst transmission correctly, then it requests the set of cooperating terminals to retransmit the data burst. Also, if none of the designated RS(s) have correctly received the uplink data burst in the first hop (e.g., if the RSs send NACKs to the BS), then the BS allocates bandwidth (which may be communicated in an UL-MAP) for the MS to retransmit the data burst.

Figure 8:
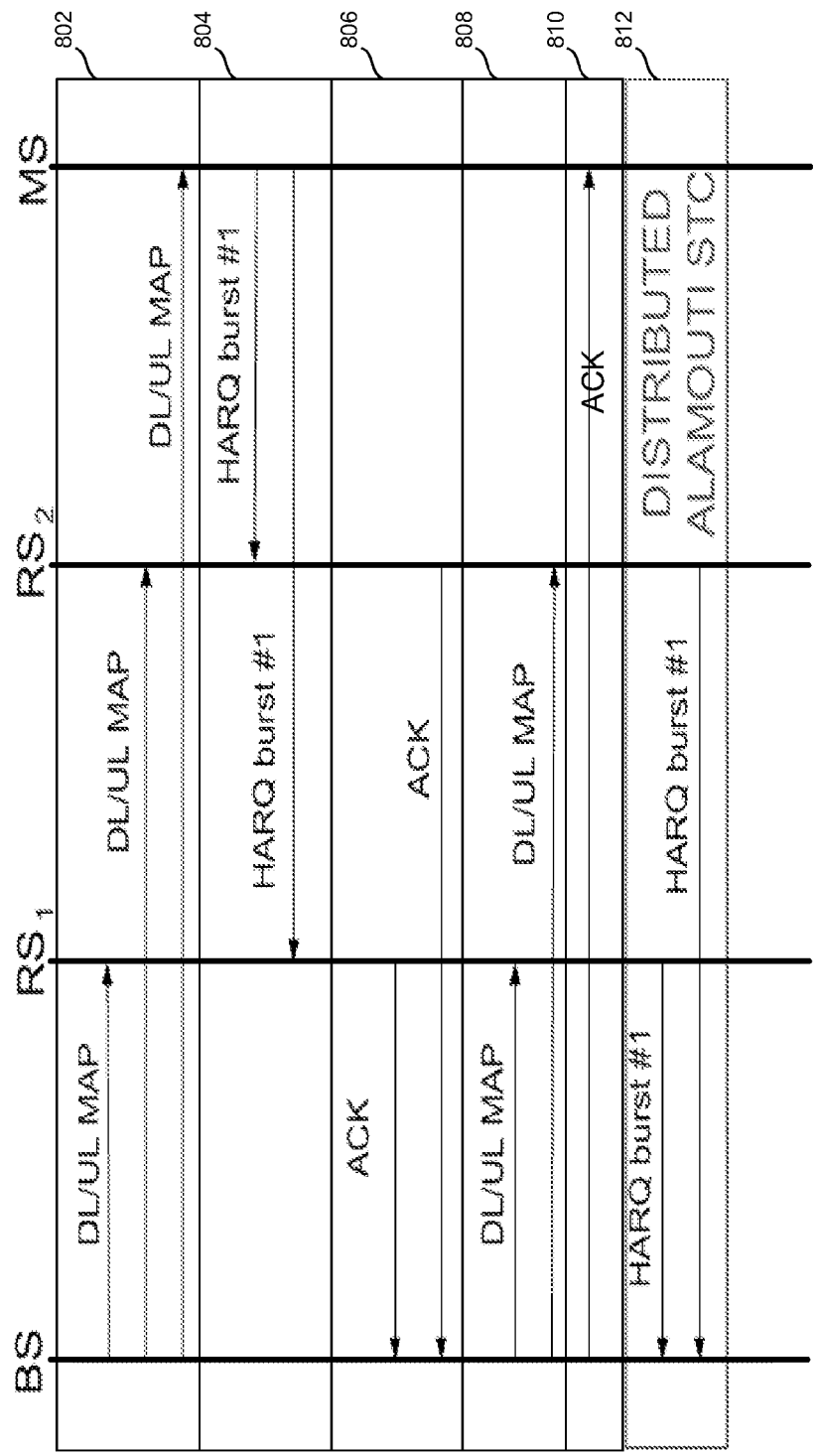

FIG. 8 is a diagram showing exemplary uplink communications according to the enhanced cooperative hop-by-hop HARQ algorithm. In particular, FIG. 8 shows an interaction among a base station (BS), a first relay station ($RS_1$), a second relay station ($RS_2$), and a mobile station (MS).

This interaction includes a step 802, in which the BS transmits resource allocations (e.g., in the form of a DL-MAP and an UL-MAP). These allocations provide resources for an uplink data transmission from the MS to $RS_1$ and $RS_2$, as well as for ACK/NACK messaging from $RS_1$, $RS_2$.

Based on these resource allocations, the MS sends the uplink data transmission (shown as HARQ burst #1) in a step 804. This transmission is received by $RS_1$ and $RS_2$. Accordingly, at a step 806, $RS_1$ and $RS_2$ both send the BS an ACK message (indicating successful decoding of HARQ burst #1).

At a step 808, the BS sends resource allocations (e.g., in the form of a DL-MAP and an UL-MAP). These allocations provide for retransmission of the uplink data transmission by $RS_1$ and $RS_2$, as well as for ACK/NACK messaging from the BS.

Based on these allocations, the BS transmits an ACK to the MS at a step 810. This ACK indicates to the MS that $RS_1$ and $RS_2$ successfully decoded HARQ burst #1. Also, based on these allocations, $RS_1$ and $RS_2$ retransmit HARQ Burst #1 at a step 812. As shown in FIG. 8, this involves simultaneous transmission according to a distributed Alamouti space-time code. However, other techniques may be employed.

B. Relay-Assisted

According to the enhanced cooperative relay-assisted HARQ algorithm, the BS determines (based on ACK//NACK messaging results) whether the RS(s) and/or the MS should retransmit the uplink data burst transmission. In this setting, while the MS directly transmits to the BS, RS(s) will monitor this transmission based on their knowledge of the UL-MAP. If the BS fails to decode the uplink data burst transmission while one or more RS(s) have the correct uplink data burst transmission (learned by BS through ACK/NACK messages from each RS), the BS confirms by sending an ACK message to the MS. Thus, retransmissions to the BS may be simultaneously handled by a set of cooperating terminals (composed of the RS(s) and/or the MS) over a second hop.

To do this, the BS selects a set of cooperating terminals. For example, the BS may select the RS(s) that have sent ACK message(s) and/or the MS. In turn, the BS allocates bandwidth (and communicates it in an UL MAP) to the set of cooperating terminals to simultaneously relay the uplink data burst transmission using particular transmission technique(s).

If the BS cannot recover the data burst transmission correctly in the second hop, then the BS may send a NACK to the cooperating terminals and allocates bandwidth (which may be communicated in a UL MAP) for the set of cooperator(s) to retransmit the saved data burst transmission.

If none of the designated RS(s) have the correct uplink data burst transmission sent in the first hop (e.g., if the RS(s) all send NACKs to the BS) and the BS cannot recover it either, then the BS may send a NACK to the MS. Also, the BS may allocate resource(s) (which may be communicated in an UL-MAP) for the MS to retransmit the burst. If the BS recovers the burst from the MS, then regardless of ACK/NACK messages from the designated RS(s), the BS will confirm its reception by sending an ACK message to the MS.

Figure 9:
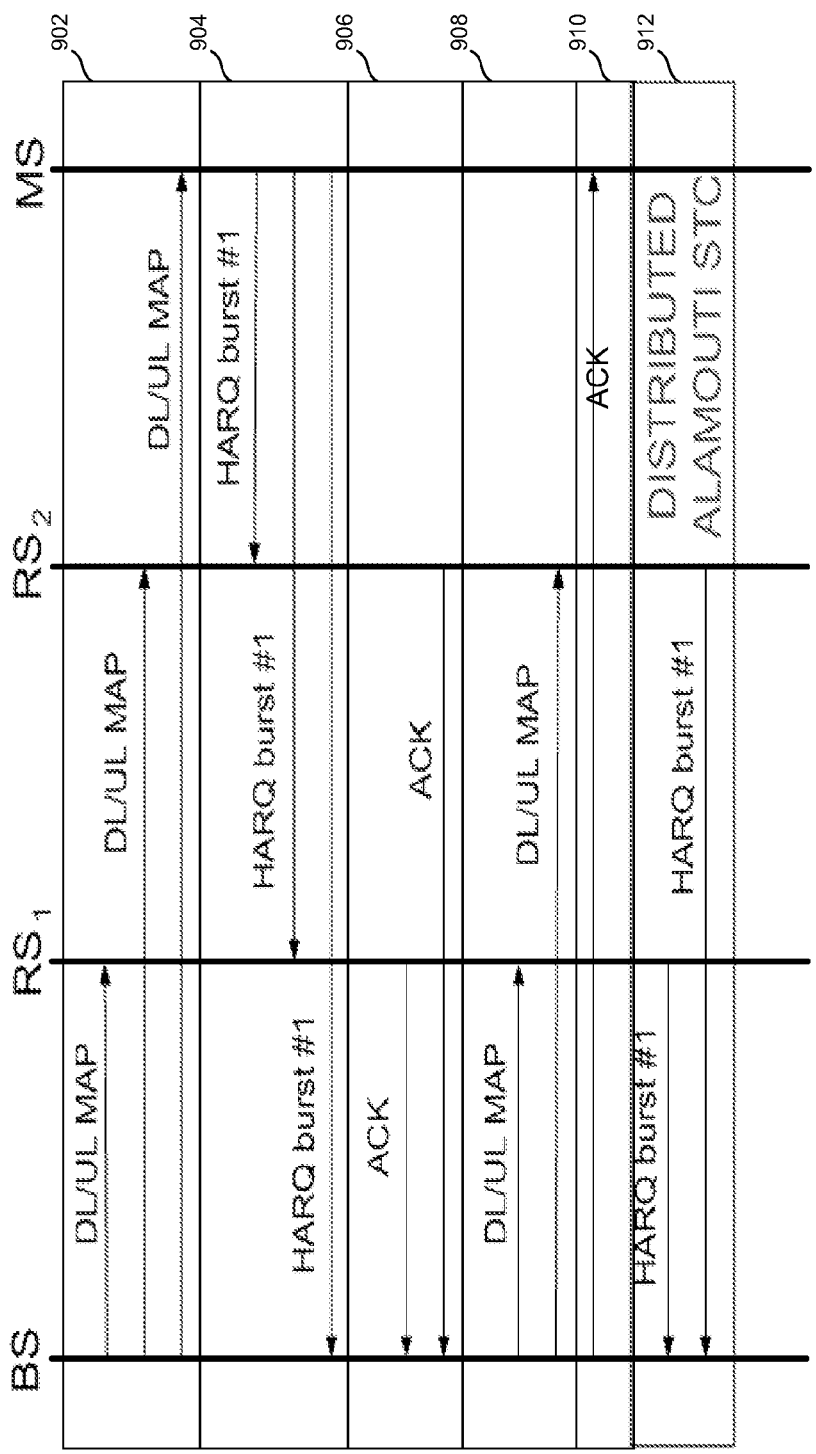

FIG. 9 is a diagram showing exemplary uplink communications according to the enhanced cooperative relay-assisted HARQ algorithm. In particular, FIG. 9 shows an interaction among a base station (BS), a first relay station ($RS_1$), a second relay station ($RS_2$), and a mobile station (MS).

This interaction includes a step 902, in which the BS transmits resource allocations (e.g., in the form of a DL-MAP and an UL-MAP). These allocations provide resources for an uplink data transmission from the MS to the BS, $RS_1$, and $RS_2$, as well as for ACK/NACK messaging from $RS_1$ and $RS_2$.

Based on these resource allocations, the MS sends the uplink data transmission (shown as HARQ burst #1) in a step 904. This transmission is received and successfully decoded by $RS_1$ and $RS_2$. However, this transmission is not successfully decoded by the BS. At a step 906, $RS_1$ and $RS_2$ both send the BS an ACK message indicating that they successfully decoded HARQ burst #1.

At a step 908, the BS sends resource allocations (e.g., in the form of a DL-MAP and an UL-MAP). These allocations provide for retransmission of the uplink data transmission by $RS_1$ and $RS_2$, as well as for ACK/NACK messaging from the BS.

Based on these allocations, the BS transmits an ACK to the MS at a step 910. This ACK indicates to the MS that $RS_1$ and $RS_2$ successfully decoded HARQ burst #1. Also, based on these allocations, $RS_1$ and $RS_2$ retransmit HARQ Burst #1 at a step 912. As shown in FIG. 9, this involves simultaneous transmission according to a distributed Alamouti space-time code. However, other techniques may be employed.

VII. Transmission Techniques

Embodiments provide for transmissions (e.g., simultaneous transmissions) by multiple cooperating devices. Various techniques may be employed for such transmissions. Examples of such techniques include (but are not limited to) virtual multiple-input and multiple-output (MIMO) methods, such as distributed space-time coding and distributed beamforming.

Such techniques may be dynamically determined by various devices (e.g., by base stations). In the context of WiMAX/WiMAX II networks, such determinations may occur on a burst-by-burst basis or on a sub-burst-by-sub-burst basis. For instance, the BS may specify space-time transmission techniques (e.g. distributed space-time coding, signal repetition, distributed beamforming, etc.) for cooperating terminals in DL-MAPs. This allows the cooperating terminals RS(s) to adapt their transmissions accordingly. Moreover, this may allow the MS to adapt its reception accordingly. The dynamic determination of transmission techniques may be based on ACK/NACK reporting from cooperating devices (e.g., RSs).

Based on when a space-time transmission technique is selected, corresponding MIMO pilot patterns may be used by the cooperating devices for channel estimation. For example, if the number of cooperating devices is two, then distributed Alamouti space-time coding (STC) may be chosen. Moreover, if each cooperating device has a single antenna, then the same pilot patterns can be used as in a MIMO system with two transmit and one receive antennas employing an Alamouti STC so that the destination device (e.g., MS or BS) may estimate the channels from itself to the cooperating devices. Furthermore, this may provide for adaptive modulation and coding (AMC) schemes for cooperative retransmissions. In the contacts of WiMAX/WiMAX II networks, such techniques may be employed to be backwards compatible, where feasible.

VIII. Selection of Cooperating Devices

As described herein, devices (e.g., BSs) may select cooperating device sets. This selection may be conducted in a dynamic manner or in a static manner. Dynamic selection may involve a device specifying cooperating device sets for each transmission. In the context of WiMAX/WiMAX II networks, dynamic selections may be communicated, for example, in DL-MAPs and/or in UL-MAPs.

However, in a static manner, the set of cooperating devices may be selected for longer time durations. Such selections may be signaled, for example, by BSs using media access control (MAC) management messages. An exemplary MAC management message that may be employed for this purpose is the cooperative diversity configuration message for RS (RS CDC) as provided by the IEEE 802.16j WiMAX standard. Thus, in embodiments, static selections do not depend on instantaneous channel quality indicator (CQI) values for different RS links.

In further embodiments, the use of DL-MAPs and UL-MAPs for static cooperating device selection may be possible. Instead of specifying sets of cooperating devices for each transmission (i.e. as in dynamic cooperator selection), DL-MAPs and UL-MAPs may be used to specify sets of cooperating devices over a period of multiple transmissions. For instance, a chosen set of cooperating devices may remain fixed over multiple transmission durations. This approach may provide a greater degree of flexibility over approaches employing MAC management messages. In the meantime, this approach may require less overhead than dynamic techniques (e.g., reducing the amount of information in DL-MAPs and UL-MAPs).

Although static selection of cooperating device sets do not change for each transmission, transmission techniques may change on a transmission by transmission basis. For instance, if a device in the set of cooperating devices (e.g., an RS) has not yet received a transmission correctly from the source device (e.g., a BS or an MS), it will not be allowed to transmit any data in the second hop. However, since the source device knows the reception status at each cooperating device from the acknowledgement channel (ACKCH), it will be able to configure the cooperative devices' space-time transmission mode which will be used in the second hop. As described above, the transmission mode may be advertised, for example, in a DL MAP and/or an UL-MAP.

Thus, cooperative space-time transmission modes may be chosen such that they will only require transmissions from a subset of the cooperating devices (e.g., cooperating devices that have a correct version of the data transmission). In embodiments, certain parts or characteristics of the cooperative space-time transmission mode may be established statically (e.g., through MAC message(s)), while other parts or characteristics may be established dynamically (e.g., through DL MAPs and/or UL-MAPs).

IX. Conclusion

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Thus, it should be understood that the various embodiments described herein have been presented by way of example only, and not in limitation. For instance, embodiments are not limited to WiMAX or WiMAX II implementations.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   selecting a set of two or more cooperating devices;
   sending a transmission from a source device to a destination device and to one or more of the two or more cooperating devices;
   receiving an acknowledgement, a negative acknowledgement or no acknowledgement from the source device and the cooperating devices; and
   determining one or more characteristics for two or more retransmissions, the two or more retransmissions from the source device and a corresponding one or more of the two or more cooperating devices that returned an acknowledgement when the destination device returned a negative acknowledgement or no acknowledgement.

2. The method of claim 1, wherein the two or more cooperating devices includes one or more cooperating devices that have acknowledged receipt of the initial transmission from the source device.

3. The method of claim 1, comprising modifying the set of cooperating devices and retransmission characteristics for different retransmissions.

4. The method of claim 1, wherein said determining the one or more characteristics comprises allocating one or more resources for the two or more retransmissions.

5. The method of claim 1, wherein said determining the one or more characteristics comprises selecting a distributed space-time coding technique for the one or more retransmissions.

6. The method of claim 1, wherein said determining the one or more characteristics comprises selecting a distributed beamforming technique for the one or more retransmissions.

7. The method of claim 1, further comprising:
   sending the one or more characteristics to the two or more cooperating devices in a portion of a subframe.

8. An apparatus, comprising:
   a selection module to select two or more cooperating devices;
   a radio module to send a transmission to the two or more cooperating devices; and
   a determination module to determine one or more characteristics for two or more retransmissions, each of the two or more retransmissions from a corresponding one or more of the two or more cooperating devices that returned an acknowledgement of the transmission;
   wherein each of the two or more retransmissions is of an initial transmission sent by a source device for which a negative acknowledgement or no acknowledgement is received from one or more of the two or more cooperating devices or from a destination device.

9. The apparatus of claim 8, further comprising a transceiver to send to the two or more cooperating devices an indication of their selection.

10. The apparatus of claim 9, wherein the transceiver is to send the indication in at least one of a DL-MAP and a UL-MAP and/or using MAC management messages.

11. The apparatus of claim 9, wherein the transceiver is to send an indication of the one or more characteristics to the two or more cooperating devices.

12. The apparatus of claim 11, wherein the transceiver is to send the indication in at least one of a DL-MAP and a UL-MAP and/or using MAC management messages.

13. The apparatus of claim 8, wherein the initial transmission and each of the retransmissions are uplink data burst transmissions.

14. The apparatus of claim 8, wherein the initial transmission and each of the retransmissions are downlink data burst transmissions.

15. The apparatus of claim 8, wherein the retransmissions employ a distributed space-time coding transmission technique.

16. The apparatus of claim 8, wherein the retransmissions employ a distributed beamforming technique.

17. The apparatus of claim 8, wherein the selection module may change the set of cooperating devices and the determination module may change the retransmission characteristics across different retransmissions.

18. A system, comprising:
   a source device to send an initial transmission; and
   two or more cooperating devices to each simultaneously send a retransmission of the initial transmission to a destination device when they each receive the initial transmission if no message is sent from the source device to the destination device or a negative acknowledgement or no acknowledgement is received from one or more of the two or more cooperating devices.

19. The system of claim 18, wherein the source device or the destination device is to select the two or more cooperating devices and determine one or more characteristics for each of the retransmissions.

20. The system of claim 18,
   wherein two or more cooperating devices includes the source device; and
   wherein the source device is to resend the initial transmission when the two or more cooperating devices fail to acknowledge receipt of the initial transmission.

* * * * *